(12) United States Patent
Fogel et al.

(10) Patent No.: US 9,444,316 B2
(45) Date of Patent: Sep. 13, 2016

(54) METHOD AND DEVICE FOR EXTRACTION OR INTRODUCTION OF A ROTOR FROM OR INTO A STATOR OF AN ELECTRIC MACHINE

(71) Applicant: ALSTOM Technology Ltd, Baden (CH)

(72) Inventors: Robert Fogel, Wroclaw (PL); Daniel Hediger, Othmarsingen (CH); Urs Hafner, Künten AG (CH); Jacek Kanicki, Wroclaw (PL)

(73) Assignee: ALSTOM TECHNOLOGY LTD, Baden (CH)

( * ) Notice: Subject to any disclaimer, the term of this patent is extended or adjusted under 35 U.S.C. 154(b) by 97 days.

(21) Appl. No.: 13/916,163

(22) Filed: Jun. 12, 2013

(65) Prior Publication Data

US 2013/0333201 A1   Dec. 19, 2013

(30) Foreign Application Priority Data

Jun. 13, 2012   (EP) .................................... 12461522

(51) Int. Cl.
| | |
|---|---|
| *H02K 15/02* | (2006.01) |
| *H02K 15/10* | (2006.01) |
| *H02K 15/16* | (2006.01) |
| *H02K 15/00* | (2006.01) |

(52) U.S. Cl.
CPC .......... *H02K 15/16* (2013.01); *H02K 15/0006* (2013.01); *Y10T 29/49012* (2015.01); *Y10T 29/53143* (2015.01)

(58) Field of Classification Search
CPC .. H02K 15/0006; H02K 15/02; H02K 15/16; H02K 16/04; F03D 1/001; F03D 1/003; F03D 1/0633; Y10T 29/49009; Y10T 29/49012; Y10T 29/5171; Y10T 29/5173; Y10T 29/53091; Y10T 29/5313; Y10T 29/53274
USPC ...... 29/426.1, 428, 469, 509, 596–598, 721, 29/729, 732, 760; 249/120, 137, 161; 425/63, 117, 166
See application file for complete search history.

(56) References Cited

U.S. PATENT DOCUMENTS

| | | | | |
|---|---|---|---|---|
| 3,932,929 | A | * | 1/1976 | Hallerback et al. ............ 29/596 |
| 4,395,816 | A | | 8/1983 | Pangburn |
| 4,955,128 | A | * | 9/1990 | Sogabe et al. .................. 29/596 |

(Continued)

FOREIGN PATENT DOCUMENTS

| | | |
|---|---|---|
| EP | 2372884 A1 | 10/2011 |
| JP | S62236343 A | 10/1987 |

(Continued)

OTHER PUBLICATIONS

Partial European Search Report dated Feb. 14, 2013.
Extended European Search Report dated May 13, 2013.

*Primary Examiner* — Paul D Kim
(74) *Attorney, Agent, or Firm* — Alstom Technology Ltd

(57) ABSTRACT

The method for extraction or introduction of a rotor (4) from or into a stator (2) of an electric machine (1) includes removing the fan blades (20) from the seats (19) of the rotor shaft (26), connecting a first guide (16) into the seats (19) of the removed fan blades (20), connecting a second guide (23) to the stator or to an element fixed to the stator (2), extracting or inserting the rotor (4) by sliding the first guide (16) on the second guide (23).

11 Claims, 2 Drawing Sheets

(56) References Cited

U.S. PATENT DOCUMENTS

| | | |
|---|---|---|
| 8,353,100 B2 * | 1/2013 | Sugimoto .................... 29/732 |
| 2008/0174200 A1 * | 7/2008 | Okamoto et al. ............ 310/217 |
| 2011/0162194 A1 | 7/2011 | Sugimoto |

FOREIGN PATENT DOCUMENTS

| | | |
|---|---|---|
| JP | 52-145301 U | 9/1994 |
| JP | 6245436 A | 9/1994 |

\* cited by examiner

METHOD AND DEVICE FOR EXTRACTION OR INTRODUCTION OF A ROTOR FROM OR INTO A STATOR OF AN ELECTRIC MACHINE

CROSS-REFERENCE TO RELATED APPLICATION

This application claims priority to European Patent Application Serial No. 12461522.0; filed on Jun. 13, 2012, entitled "METHOD AND DEVICE FOR EXTRACTING OR INTRODUCTION OF A ROTOR FROM OR INTO A STATOR OF AN ELECTRIC MACHINE" which is incorporated herein by reference in its entirety

TECHNICAL FIELD

The present disclosure relates to a method and device for extraction or introduction of a rotor from or into a stator of an electric machine.

The electric machine can be a rotating electric machine such as a synchronous generator to be connected to a gas or steam turbine (turbogenerator) or a synchronous generator to be connected to a hydro turbine (hydro generator) or an asynchronous generator or a synchronous or asynchronous electric motor or also other types of electric machines.

BACKGROUND

Rotating electric machines have a stator and a rotor inserted and rotatable within the stator.

In order to insert the rotor into the stator or also to extract the rotor from the stator (for example for maintenance operations), cushions fed with compressed air are provided between the stator and rotor; the rotor is thus slid on these cushions.

Since during sliding the rotor could rotate and fall on the stator and damage it, EP 2 372 884 discloses to provide a guide connected to the rotor shaft by belts and another guide connected to the bearing pedestal lower half.

During introduction or extraction of the rotor with respect to the stator, these guides prevent rotation by sliding one on the other.

Nevertheless, in some cases, the connection made using the belts could be not reliable; thus the risk could exist that the guides are not able to drive the rotor correctly during extraction from or introduction into a stator, such that the rotor can rotate and fall from the cushions on the stator.

SUMMARY

An aspect of the disclosure includes providing a method and device that permit rotor extraction from or introduction into a stator in a reliable way.

These and further aspects are attained by providing a method and device in accordance with the accompanying claims.

BRIEF DESCRIPTION OF THE DRAWINGS

Further characteristics and advantages will be more apparent from the description of a preferred but non-exclusive embodiment of the method and device, illustrated by way of non-limiting example in the accompanying drawings, in which.

DETAILED DESCRIPTION OF EXEMPLARY EMBODIMENTS

Figure 1:
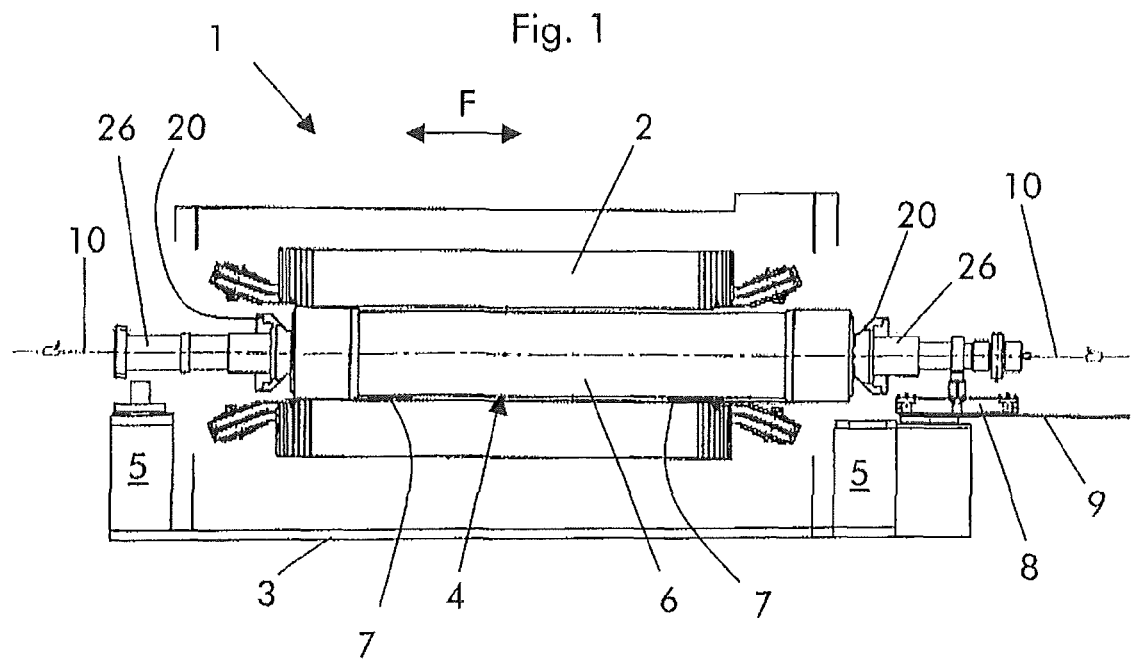
FIG. 1 shows a schematic view of an electric machine such as an electric generator like a turbogenerator.

With reference to the figures, an electric machine 1 such as an electric generator has a stator 2 housed in a foundation 3 and a rotor 4 supported by bearings 5.

The rotor 4 has an active part 6 and shafts 26 extending from the active part 6.

In order to extract the rotor 4 from the stator 2 (or introducing the rotor 4 into the stator 2) cushions 7 are provided between the stator 2 and rotor 4.

Then one or both bearings 5 are removed (for example the bearing at the right side of FIG. 1) and a dolly 8 movable on rails 9 (but the rails are not mandatory) supports the rotor 4.

Cables 10 are also provided to move the rotor 4 out (extraction) or into (introduction) the stator 2 as indicated by arrow F.

In order to drive the rotor 4 and prevent its rotation with respect to the stator 2, causing the rotor fall from the cushions 7, a device 15 for extraction or introduction of the rotor 4 from or into a stator 2 of an electric machine is provided.

The device 15 includes a first guide 16 and first connecting elements 17 for connection of the first guide 16 to one or more seats 19 of a fan blade 20 of the rotor 4.

In addition, the device 15 includes a second guide 23 for connection to the stator 2 or to an element fixed to the stator 2.

The element fixed to the stator 2 can be an element of the electric machine, such as the stator 2 itself or the casing of the electric machine or also a different element. In addition the element fixed to the stator 2 can be an element that is not part of the electric machine, such as a specific element fixed to the foundation 3.

The first guide 16 has a circular sector 25 that can rest on at least a portion of the rotor 4 (in particular it rests on the shaft 26 at the seats 19).

The circular sector 25 has apertures 27 for engagement of the first connecting elements 17. Preferably, the apertures 27 are circumferentially elongated apertures for the adjustment of the first connecting elements 17.

The first guide 16 also has a bar 28 extending from the circular sector 25 connected to the guiding profile 22.

The first connecting elements 17 include a sleeve 30 insertable into the seats 19 and a fixing element 31 such as a screw, for fixing the sleeves into the seats 19.

In addition, the first connecting elements 17 also include fixing elements 32 (such as screws) for fixing the circular sector 25 to the sleeve 30.

For example, the rotor 4 can have a protruding ring 33 and the seats 19 can be provided on the protruding ring 33.

In this case the protruding rings 33 defines walls of the seats 19. The fixing elements 31 for fixing the sleeves 30 into the seats 19 penetrate a wall of the seats 19.

The operation of the device is apparent from that described and illustrated and is substantially the following.

First the first guide 16 is connected to the rotor.

For this reason the fan blades 20 of the rotor are removed from the seats 19. Thus the sleeves 30 are inserted into two or more seats 19 (according to the design) and are fixed through screws 31.

Figure 2:
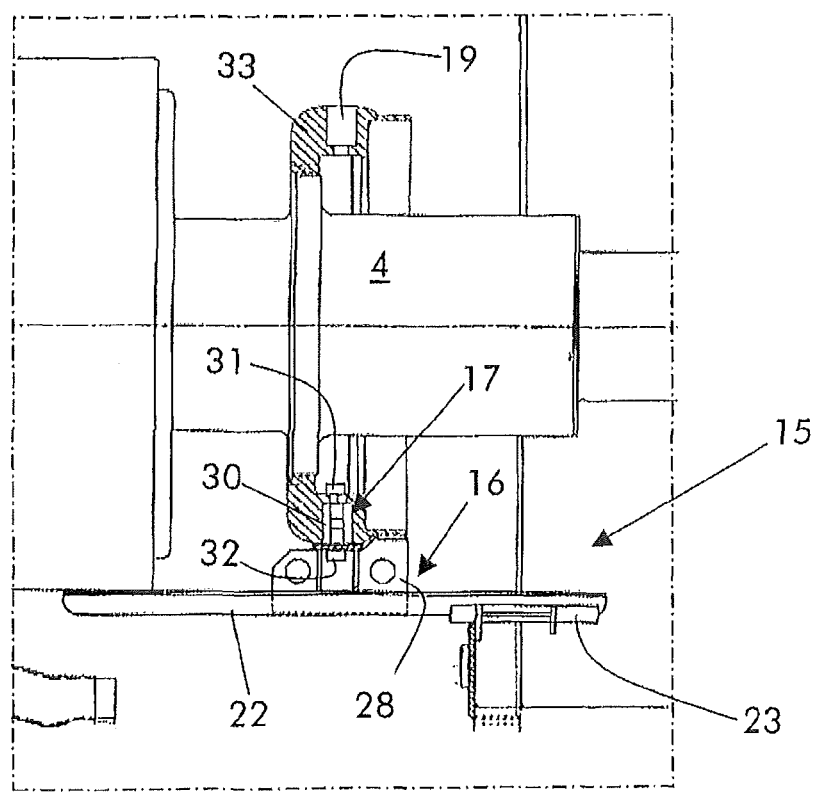
FIGS. 2 and 3 show a first embodiment of the device connected to an electric machine.
Figure 3:
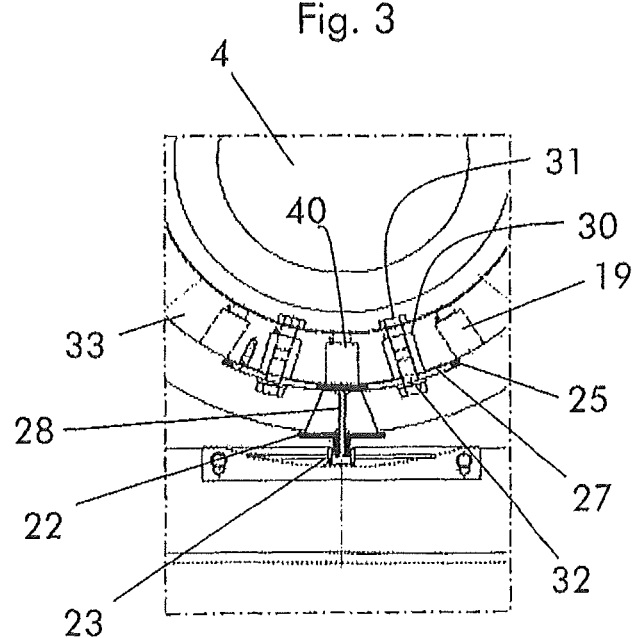

For example the screws 31 are provided radially and are connected to a wall or the ring 33 facing the rotor 4 (FIG. 2).

Figure 4:
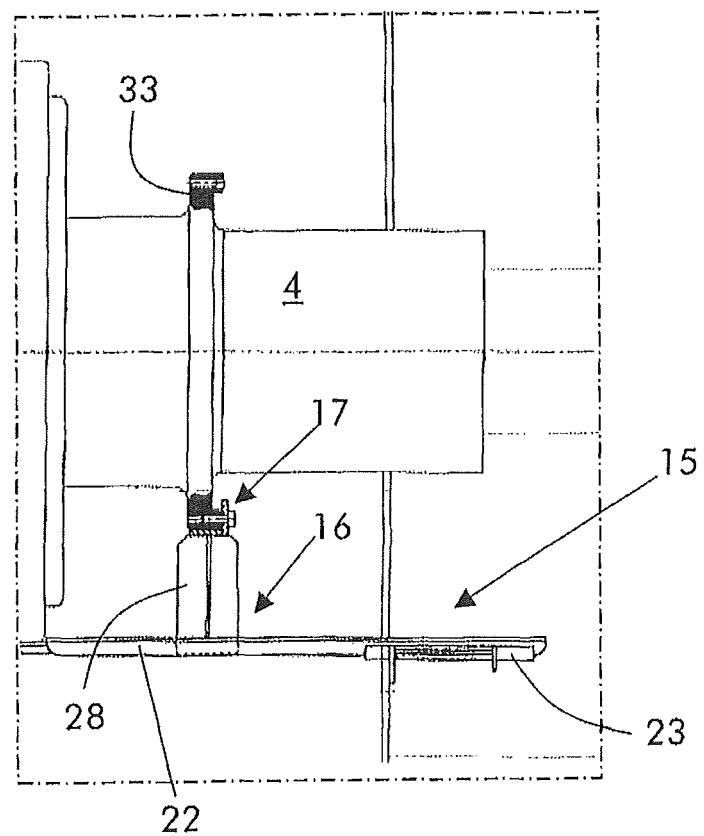
FIG. 4 shows a second embodiment of the device connected to an electric machine.

Alternatively, the screws 31 are provided axially (FIG. 4).

Naturally also other embodiments in addition to those shown are possible.

Thus the circular sector 25 with the bar 28 and guiding profile 22 is fixed to the ring 33 by connecting the screws 32 to the sleeves 30.

The second guide 23 is connected to the stator 2 or an element fixed to it.

Thus extraction of the rotor 4 from the stator or introduction of the rotor into the stator 2 is carried out by sliding the first guide 16 (in particular the guiding profile 22 thereof) on the second guide 23.

Since connection of the first guide 16 to the ring 33 and connection of the second guide 23 to the stator 4 is very stiff, driving of the rotor to prevent its rotation is reliable.

The present disclosure also refers to a method for extraction or introduction of a rotor from or into a stator of an electric machine.

The method includes:

removing one or more fan blades 20, connecting a first guide 16 into the seats 19 of the removed fan blades 20, connecting a second guide 23 to the stator 2 or to an element fixed to the stator 2, extracting or inserting the rotor 4 by sliding the first guide 16 on the second guide 23.

Preferably the first guide is connected to at least two seats 19 and at least one free seat 40 is provided between the two seats 19 to which the first guide 16 is connected. The first guide 16 is not connected to the free seats 40.

Connecting the first guide 16 into the seats 19 includes fixing a sleeve 30 into the seats 19, and connecting the first guide 16 to the sleeve 30.

In particular, fixing the sleeve 30 includes inserting the sleeve 30 into the seats 19, and providing a fixing element 31, such as a screw penetrating a wall of the seats 19.

Naturally the features described may be independently provided from one another.

In practice the materials used and the dimensions can be chosen at will according to requirements and to the state of the art.

The invention claimed is:

1. A method for extraction or introduction of a rotor from or into a stator of an electric machine, the rotor having at least one shaft that carries fan blades; the method comprising:

connecting a first guide into at least one seat of at least one fan blade;

connecting a second guide to the stator or an element fixed to the stator;

extracting or inserting the rotor by sliding the first guide on the second guide.

2. The method according to claim 1, further comprising connecting the first guide to at least two seats.

3. The method according to claim 2, further comprising providing at least one free seat between the at least two seats to which the first guide is connected, wherein the first guide is not connected to the free seat.

4. The method according to claim 1, wherein connecting the first guide into the at least one seat includes: fixing a sleeve into the at least one seat, and connecting the first guide to sleeve.

5. The method according to claim 4, wherein the fixing the sleeve includes:

inserting the sleeve into the at least one seat, and providing a fixing element penetrating a wall of the at least one seat.

6. A device for extraction or introduction of a rotor from or into a stator of an electric machine; the device comprising:

a first guide;

a second guide connectable to the stator or to an element fixed to the stator, wherein the first and second guide being slidable one on the other; and first connecting elements for connection of the first guide to at least one seat of a fan blade of the rotor.

7. The device according to claim 6, wherein the first guide includes:

a circular sector that can rest above at least a portion of the shaft at the at least one seat, wherein the circular sector includes apertures for engagement of the first connecting elements;

a bar extending from the circular sector; and a guiding profile connected to the bar.

8. The device according to claim 7, wherein the apertures are circumferentially elongated apertures.

9. The device according to claim 7, wherein the first connecting elements include:

a sleeve insertable into the at least one seat;

a first fixing element for fixing the sleeve into the at least one seat; and a second fixing element for fixing the circular sector to the sleeve.

10. The device according to claim 9, wherein:

the rotor has a protruding ring;

the at least one seat is provided on the protruding ring;

the protruding ring defines walls of the at least one seat; and the fixing element for fixing the sleeve into the at least one seat can penetrate a wall of the at least one seat.

11. The method according to claim 1, further comprising removing at least one fan blade before connecting the first guide into at least a seat of the removed at least a fan blade.

* * * * *